Feb. 4, 1969  M. A. PINNEGAR  3,425,839
CONTINUOUS BEER MAKING PROCESS WHEREIN THE WORT AND
YEAST ARE SEPARATED BY A POROUS PARTITION
Filed June 17, 1966

Michael Alan Pinnegar,
Inventor

By Wenderoth, Lind & Ponack,
Attorneys

United States Patent Office 3,425,839
Patented Feb. 4, 1969

3,425,839
CONTINUOUS BEER MAKING PROCESS WHEREIN THE WORT AND YEAST ARE SEPARATED BY A POROUS PARTITION
Michael Alan Pinnegar, Reigate, Surrey, England, assignor to Brewing Patents Limited, London, England, a British company
Filed June 17, 1966, Ser. No. 558,387
Claims priority, application Great Britain, Sept. 7, 1965, 38,251/65
U.S. Cl. 99—31                5 Claims
Int. Cl. C12c 9/02

ABSTRACT OF THE DISCLOSURE

A potable beer is produced by circulating a body of yeast-containing liquor on one side of a partition and maintaining a moving body of wort on the opposite side of the partition. The partition is porous and has a pore size small enough to effectively bar the passage of yeast cells, but allows the passage of the soluble constituents of the wort and the soluble products resulting from the fermentation of the wort by the yeast.

---

Figure 1:
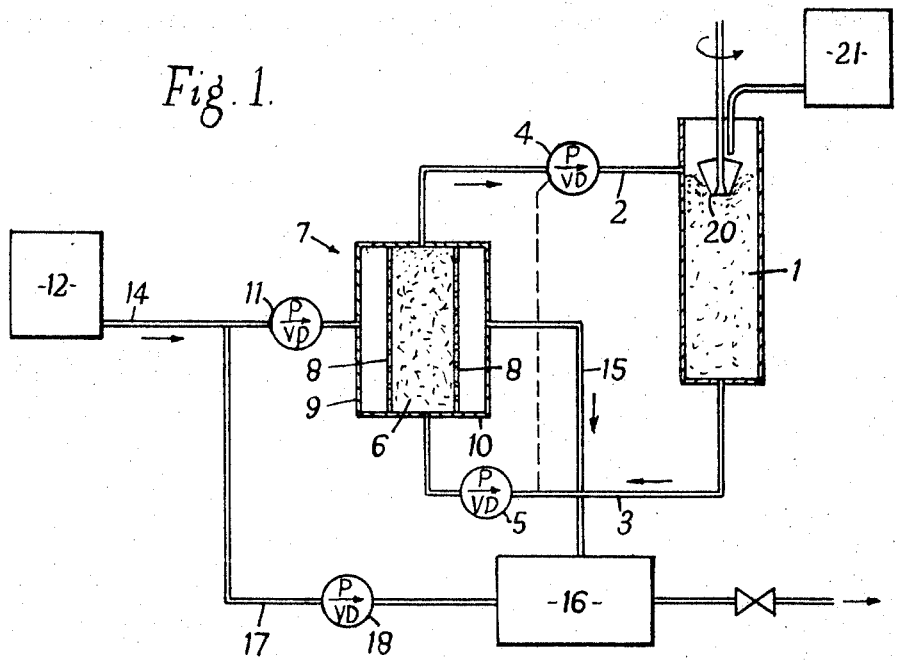

The present invention relates to the production of potable beer by the fermentation of brewers wort by yeast in a continuous fermentation process. The term "continuous fermentation process" is used herein to refer to a fermentation process, in which brewers wort is introduced in a stream into a fermentation zone. The stream of wort can be introduced at either constant or varying rates and may be continuous or discontinuous in the sense of being interrupted at constant or varying intervals. However in the generally preferred procedure brewers wort is introduced into the fermentation zone at a substantially constant rate over a substantial period of time e.g. not less than five days.

In conventional batch brewing the fermentation of wort is effected by the introduction of a limited amount of yeast into a batch of worth in a fermentation vessel. During the initial stages, the amount of yeast increases several-fold, mainly by vegetative growth, and the main part of the fermentation is brought about by a variable proportion of the augmented amount of yeast.

The fermentation of brewers' wort can also be carried out on a continuous stream of wort introduced into a fermentation zone, containing a constant volume of fermenting material, as well as by what can be called "semi-continuous" or "extended batch" methods. In the simplest form these consist of introducing a supply of wort at a controlled rate into a fermentation vessel, the contents of which are stirred and consist of a suspension of yeast in beer or a partly fermented wort and withdrawing beer from the vessel. In the case of continuous operation the rate of withdrawal necessarily is the same as the rate at which fresh wort is introduced whereas under semi-continuous conditions the withdrawal is intermittent according to the specific mode of usage.

In the foregoing processes the working concentration of yeast depends largely on the response of the yeast to the nutritive character of the wort. Thus in a fully continuous system of the kind outlined, the concentration of the yeast and in turn the rapidity and extent of the fermentation are, at any particular temperature, dependent upon the rate of withdrawal of fermented beer. Withdrawal of a quantity of fermented beer necessarily entails withdrawal of a quantity of yeast with the result that the efficiency (the rate of conversion of fermentable sugars into alcohol) of the whole process is reduced.

To improve the efficiency, various processes have been devised by which either the whole or a part of the yeast which is removed with the beer is separated and returned to the fermentation. Another variant consists in continuously adding fresh yeast to the fermentation vessel while another type of process is designed to retain within the fermentation vessel a large part of the yeast which would otherwise escape, by appropriate design of the vessel and more particularly the arrangement for the withdrawal of beer. Clearly the essential features of these processes can be combined in various ways but obviously any one of them or any combination of them whether operated with or without stirring must fall short of providing full control over the yeast concentration and yeast activity which is desirable.

All currently employed systems of continuous fermentation, both in brewing potable beer and otherwise, involve direct contact between the fermentation medium and the organism which provides the enzymic mechanism to effect the fermentation of the fermentable constituents of the medium. This circumstance leads to various difficulties. Thus, it is well recognised that even if the effect organism is provided initially in a pure form free from undesirable contaminating organisms, it is difficult to ensure that such contaminant organisms do not gain entry by way of the continuous supply of fresh medium or the associated mechanical equipment. When such entry takes place there is a risk that the success of the whole operation may be jeopardised for an inconvenient period before the infection by contaminant organism is detected. In brewing potable beer, contamination of the selected strain of yeast by undesired micro-organisms from external sources may lead to changes in fermentation rate and to the production of "off" flavours in the beer. Again, the usual systems of continuous fermentation are inevitably complicated by the need of subsidiary apparatus to separate the fermentative organism from the fermented liquid at the conclusion of the process.

In the process of the present invention a circulating body of yeast-containing medium is maintained on the opposite side of a partition from a moving body of wort, the partition being essentially porous to permit the passage of the soluble constitutent of the wort and the soluble products resulting from the fermentation of such constituents to pass therethrough but the pore size being sufficiently small to effectively bar the passage of yeast cells therethrough.

The circulating body of yeast-containing medium is preferably moved around a closed circuit, in which the porous partition is located, so that a stream of yeast-containing medium sweeps along the face of the partition. Alternatively the porous partition may be located so as to form part of the wall of a vessel in which a body of yeast-containing medium is maintained in an agitated condition to provide the necessary movement in the immediate vicinity of the partition to carry away and disperse in the body of yeast-containing medium the soluble constituents entering through the partition.

Preferably the porous partition is of a pore size of below 3 microns to effect total retention of yeast, but porous partitions of a pore size of up to 10 microns will effectively retain yeast cells up to 7 microns in size and in some cases it is permissible to use such partitions, since it is not only permissible, but desirable to remove a proportion of the yeast cells in the fermentation zone to take account of the loss of activity due to ageing of the yeast cells. It is in fact desirable to remove about 10% of the yeast cells from the yeast-containing medium each day to maintain proper activity of the yeast cells (this rate of removal is however considerably less than the rate of removal of yeast cells from the fermentation zone in the beer in known continuous brewing processes). The removal of yeast cells may be achieved by a continuous slow bleed-off of yeast-containing liquor or by removal of definite quantities of liquor at one or more occasions during the day.

There are two essentially different methods of employing the basic principle of the invention. In one method, the wort and the yeast-containing medium are maintained on opposite sides of a partition, through which the soluble constituents of the two separate bodies of liquid diffuse to produce substantially equal concentrations in the liquid on opposite sides of the partition, i.e. fermentable sugars passing from the wort to the yeast-containing medium and alcohols from the yeast-containing medium to the wort. In this method there is little or no flow of liquid through the partition.

In the other method the yeast-containing medium is contained within a zone bounded by two separate partitions, fresh wort entering the zone through one of said partitions and a volume of fermented liquor being withdrawn from the zone through the other of said partitions.

It will readily be seen that in the second method there will be a more or less constant pressure head across both the partitions. The first method can however, be carried out with substantially no pressure head across the partition and indeed may be carried out with periodic reversal of pressure head across the partition to effect a self-cleaning action, in addition to improving the transport rate of soluble components across the partition.

These different factors lead to rather different physical requirements for the partition members employed in the two cases.

In the second case, where a substantial pressure head may be employed across the two partitions, a known so-called "sterile filter" (as conventionally used for filtering out yeast from beer) may be employed. Such filters have a pore size of approximately 0.3 micron and may be composed of cellulose nitrate and cellulose acetate.

In the first method the partition must essentially be thinner than in the second method to ensure transport of soluble components therethrough at a satisfactory rate and this is feasible because there is little or no pressure head across it. It is, however, necessary to ensure that it does not flutter excessively, which could lead to tearing. For the first method it is preferred to use definitely porous flexible diaphragms having as high a mechanical strength as possible. A preferred form of material is a commercially available resin-bonded fibreglass filter, having a pore size of 1–1.5 microns. Another satisfactory material is a porous filter sheet made by sintering finely divided particles of plastic material. This is available in different pore size of 1–1.5 microns. Another satisfactory material is a suitable for the first method of the present invention because of the essentially labyrinthine passages therethrough, coupled with the small pressure head across the partition so that if forms an effective barrier for yeast even when possessing a relatively large pore size of up to 10 microns.

In the second method referred to above a circulating stream of fermentation medium (wort) and suspended fermentative organism (yeast) is established in an enclosed circuit and fresh unfermented fermentation medium is supplied to said enclosed circuit through a first filter and fermented liquor is led out from the enclosed circuit through a membrane filter, the filters having a pore size sufficiently small to exclude fermentative micro-organisms from passage therethrough to any substantial extent, evolved carbon dioxide being led off from the enclosed circuit. In order to control the process it is necessary to maintain the quantity of liquid in the enclosed circuit at substantially constant value and to do this linked pumps may be incorporated in the enclosed yeast circuit at opposite ends of a zone within which both filters are located.

In the first method it is preferred to pump the yeast-containing liquor around an enclosed circuit, having an outlet for evolved gas, part of the enclosed circuit being bounded by a porous partition, which separates it from a passage through which a supply of wort is pumped in the same direction as the yeast containing liquor. The partition is preferably in the form of a porous tube of appropriate pore size, so as to provide an extended area for the passage of solubles between the yeast-containing liquor and the wort-supply liquor. It will be appreciated that the fermentable solubles in the wort-supply liquor will become progressively depleted as the liquor passes along the partition and at the same time the incoming wort-supply liquor will be extracting alcohol and other soluble fermentation products from the yeast-containing liquor through the partition. This return movement commences at the point where the wort-supply first reaches the partition since the yeast-containing liquor continues to ferment to produce alcohol after leaving the zone in which it is in contact with the porous partition.

Preferably means are provided for applying pressure to the liquor on both sides of the partition so as to permit a small pressure difference to be produced in both directions across the partition to render the partition virtually self-cleaning.

Figure 2:
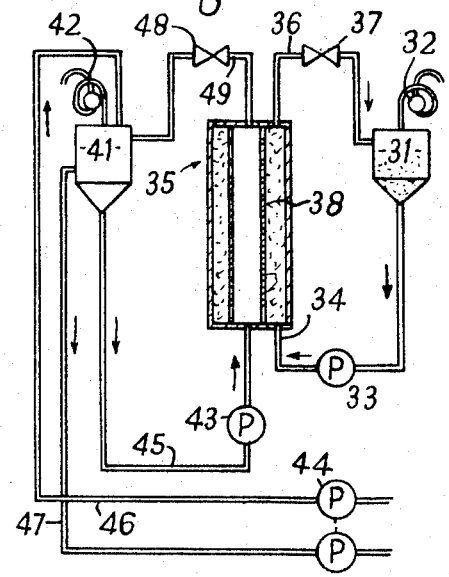

Referring now to the accompanying drawings, which are in essentially diagrammatic form:

FIGURE 1 illustrates one form of apparatus used in puting the invention into effect, and FIGURE 2 illustrates a second form of apparatus.

Referring now to FIGURE 1, which operates on the second method of puting the invention into operation fermentation is mainly carried out in an enclosed fermentation vessel or culture vessel 1, through which the fermentation medium containing suspended yeast is circulated, preferably entering the vessel at the top end through line 2 and leaving the vessel at the bottom end through line 3. The stream of fermentation medium is moved by a pair of linked variable rate pumps 4 and 5 at a predetermined rate, which will depend upon a number of different factors, particularly the degree of attenuation desired in the fermentation (percentage conversion of fermentable sugars), the rate of introduction of fresh wort into the enclosed circuit, fermentation temperature and strain of yeast employed.

In its passage from the bottom of the fermentation vessel 1 and return to the top of the fermentation vessel, the stream of fermentation medium passes through the central chamber 6 of a transfer vessel 7. This central chamber 6 is bounded on two sides by filters 8, which separate it from an inlet chamber 9 and an outlet chamber 10. Fresh wort is supplied to the inlet chamber 9 by a variable rate pump 11, which draws it from a supply tank 12 through a line 14. From the inlet chamber 9 the fresh wort passes through the first filter 8 into the stream of fermentation medium and is carried away upwardly by the circulating fermentation medium into the line 2 and thence into the fermentation vessel 1. Since the central chamber 6 is isolated by the linked pumps 4 and 5 a like amount of fermentation medium is displaced through the second filter 8 into the outlet chamber 10, by the action of the pump 11.

The fermented liquor from the outlet chamber 10 is led through line 15 to a beer receiver 16, from which, if desired, a proportion may be recycled to the inlet chamber 9 through a line 17 by the action of a pump 18.

Carbon dioxide gas is removed from the enclosed fermentation vessel 1 by means of a "vortex gas separator" 20. The vortex gas separator comprises a paddle, which is rotated to form a vortex in the top surface of the liquid in the enclosed fermentation vessel. Evolved carbon dioxide collects in this vortex space and is led off through an outlet pipe concentric with or close to the paddle spindle to a gas holder 21, from which it may be withdrawn and liquefied.

It will be understood that the two filters 8 need not be located in a common vessel particularly where conventional brewery filters are adapted for the present purpose. However, they are conveniently contained in the same structure and the circulating strain of fermentation medium effectively precludes direct passage of incoming wort from the first filter 8 to the second filter 8.

Control over the yeast population in the enclosed circulatory system may be obtained by the introduction of nutrients and oxygen into the enclosed system under sterile conditions and by either continuous or periodic removal of a proportion of the yeast. This preferably is effected by appropriate connections (not shown) to the fermentation vessel 1.

A feed-back from the beer receiver 16 to the inlet chamber 9 permits the rapid attainment of steady-state conditions on commencement of the fermentation process and a delicate control over the degree of attenuation whilst in operation.

The beer collected in receiver 16 is sterile and requires no further filtration if the filters 8 are of sufficiently fine pore size to prevent substantially complete passage of yeast cells. It contains little or no carbon dioxide, but may be recarbonated using the gas from the gas holder 21.

In-place sterilisation of the whole system by high pressure steam is possible when the membrane filters are of suitable material, i.e. not affected by steam temperature.

A particular advantage of the process is a reduction of the loss by adsorption on the yeast of valuable substances derived from hops, which contribute to beer flavour. Continued recycling of the same yeast in the enclosed system with only very slow removal and regeneration of the yeast minimises this loss.

Example 1

Brewers' wort, specific gravity 1.040 was pumped into the inlet chamber 9 of a small transfer vessel fitted with membrane filters having a pore size of $0.3\mu$, at a rate of 0.0021 gallon/hour. Fermentation medium, containing suspended yeast was circulated through the central chamber 6 at the rate of 0.0330 gallon/hour. The effective volume of the enclosed circulatory system was 0.01 gallon and the fermentation medium was maintained at a temperature of 20° C. The yeast was identified as *Saccharomyces carlsbergensis* maintained in the British National Collection of Yeast Cultures and listed in the official Catalogue as No. 396. Under these conditions the liquid passing out through the second membrane filter to the receiver had a specific gravity of 1.013. This degree of attenuation was maintained over a prolonged period. This rate of fermentation corresponds to a daily production of beer equal to 5 times the volume of the yeast suspension employed.

In the apparatus shown in FIGURE 2 both the yeast-containing liquor and the wort liquor are cycled around a closed circuit at a fairly rapid rate.

The yeast-containing liquor is passed around a closed circuit, which includes a main fermentation vessel 31, which is provided with a gas vent shown diagrammatically at 32. Yeast-containing liquor from the vessel is pumped by means of pump 33 through line 34 into the outer chamber of a transfer vessel 35. The liquor enters the bottom of the transfer vessel 35, rises in it and is displaced through return line 36 to spill into the vessel 31. A restricting valve 37 is provided in return line 36 to permit the liquor in the outer compartment of the transfer vessel to be pressurised to a desired degree. In the same manner wort liquor is cycled through an inner compartment of the transfer vessel 35, in which it is separated from the yeast-containing liquor by a porous pipe 38. In this case the main body of the wort liquor (this term is used for convenience, since the main body of such liquor is nearly fully fermented) is held in a holding vessel 41, also provided with a gas vent 42 to allow the escape of any gas that may be generated in the wort liquor circuit.

The wort liquor circuit is provided with two pumps 43, 44 which are respectively effective to recirculate wort liquor from the holding vessel 41 to the transfer vessel 35 through line 45 and to introduce fresh wort from a supply tank (not shown) into the holding vessel 41, in which it becomes mixed with the partially fermented contents, through line 46. A line 47 is also provided for the removal of fermented liquor from the holding vessel 41. A pump in line 47 may be linked with pump 44 to maintain a substantial volume of liquor in the wort liquor circuit.

A restricting valve 48 is preferably located in the return line 49 through which liquor is returned to the vessel 41 from the transfer vessel to permit pressurisation of the wort liquor in the transfer vessel.

As explained above the material of the porous tube 38 may have a pore size up to 10 microns, but a material having a pore size of 1–3 microns is preferred. It will be appreciated that the transfer vessel 35 may incorporate several parallel porous tubes 38. Alternatively the transfer vessel may be provided with longitudinal passages for yeast-containing liquor and wort liquor separated by flat porous members, which act as partitions, through which the solubles also can diffuse.

Although pressure differences can be established for cleaning purposes across the porous tube 38 by appropriate operation of the valves 37, 48, in normal operation the system was operated without such pressure difference.

Example 2

Sterile brewers' wort, specific gravity 1.040 was pumped into the wort holding tank at a rate of 18 mls./hr. and fermented liquor was withdrawn from the tank at the same rate.

Liquor from the wort holding tank was pumped through the porous tube of a transfer vessel of the type illustrated in FIGURE 2 at the rate of 500 mls./hr., the tube having an average pore size of 1 micron and an effective surface area of 70 square centimetres.

Fermentation medium, containing suspended yeast, was circulated through the outer part of the transfer vessel at the rate of 500 mls./hr. The total volume of fermentation medium was 1 litre and the fermentation medium was maintained at a temperature of 20° C. The yeast was identified as *Saccharomyces cerevisiae* which is maintained in the British National Collection of Yeast Cultures and listed in the official Catalogue as No. 240, and the concentration of such yeast in the medium was 30 gms./litre (dry weight). In order to maintain the activity of the yeast, about 10% of the yeast content was removed during each day from the fermentation liquor circuit and fresh yeast allowed to propagate to replace the removed yeast.

Under these conditions the liquor withdrawn from the holding vessel had a specific gravity of 1.009. This degree of attenuation was maintained over a prolonged period. The rate of fermentation corresponds to a daily production equal to 2.5 times the volume of the yeast suspension employed.

I claim:

1. A process for the production of potable beer comprising maintaining a circulating body of yeast-containing liquor on one side of a partition and maintaining a moving body of wort on the opposite side of the partition, the partition being essentially porous to permit the passage of the soluble constituents of the wort and the soluble products resulting from the fermentation of such constituents by the yeast to pass therethorugh, the said pore size being sufficiently small to effectively bar the passage of yeast cells therethrough.

2. A process for the production of potable beer according to claim 1 comprising maintaining a circulatory body of yeast-containing liquor, supplying a quantity of wort to said yeast-containing liquor through a first porous partition and withdrawing an equal quantity of liquor from the circulatory body of yeast-containing liquor through a second porous partition.

3. A process for the production of potable beer according to claim 2 comprising establishing a circulatory flow of yeast-containing liquor through a fermentation zone and through a transfer zone, the transfer zone including first and second porous partitions, supplying yeast-containing liquor to the transfer zone from the fermentation zone and withdrawing yeast-containing liquor from the transfer zone to the fermentation zone at substantially equal rates, supplying a stream of fresh wort under pressure to the outer surface of said first porous partition to introduce a quantity of fresh wort into said yeast containing liquor and simultaneously to displace a substantially equal quantity of filtered liquor through said second porous partition.

4. A process for the production of potable beer according to claim 2 comprising maintaining a body of yeast-containing fermenting liquor in a fermentation zone, removing evolved carbon dioxide from said fermentation zone, pumping yeast-containing liquor from the fermentation zone to a transfer zone and separately pumping liquor from the transfer zone to the fermentation zone at a substantially equal rate, supplying a quantity of fresh wort to the transfer zone through a first filter adapted to bar the passage of yeast whereby a positive pressure is built up in the transfer zone, a substantially equal quantity of liquor being displaced from the transfer zone through a second filter, also adapted to bar the passage of yeast.

5. A process for the production of potable beer according to claim 1 comprising maintaining a circulatory flow of yeast containing liquor successively through a fermentation zone and a transfer zone, said fermentation zone including a porous partition for permitting the passage of soluble constituents but barring the passage of yeast so that the circulatory flow sweeps along one surface of said porous partition and maintaining a flow of fresh wort along the opposite surface of said porous partition to effect diffusion of soluble constituents between the liquor streams on both sides of said partition without substantial transfer of liquor through the partition.

References Cited
UNITED STATES PATENTS

| 3,078,166 | 2/1963 | Shanks et al. | 99—31 X |
| 3,186,917 | 6/1965 | Gethardt et al. | 195—1 |
| 3,207,606 | 9/1965 | Williams | 99—31 |
| 3,310,407 | 3/1967 | Royston | 99—31 |

FOREIGN PATENTS 938,173　10/1963　Great Britain.

U.S. Cl. X.R.

99—35; 195—115, 37

LIONEL M. SHAPIRO, *Primary Examiner.*

D. M. NAFF, *Assistant Examiner.*